May 13, 1958 — C. P. FISHER — 2,834,896
STEPPING MOTOR
Filed Sept. 28, 1955 — 3 Sheets-Sheet 1

INVENTOR
CHARLES P. FISHER.
BY
MOSES, NOLTE, CREWS & BERRY
ATTORNEY

May 13, 1958 C. P. FISHER 2,834,896
STEPPING MOTOR
Filed Sept. 28, 1955 3 Sheets-Sheet 2
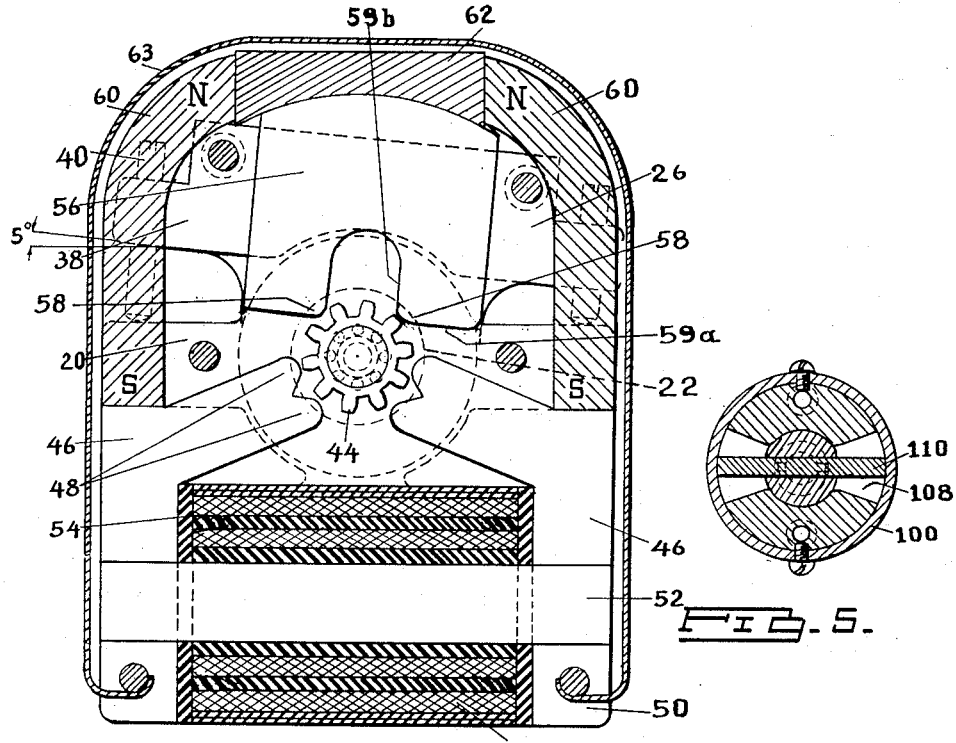
FIG. 3.
FIG. 5.
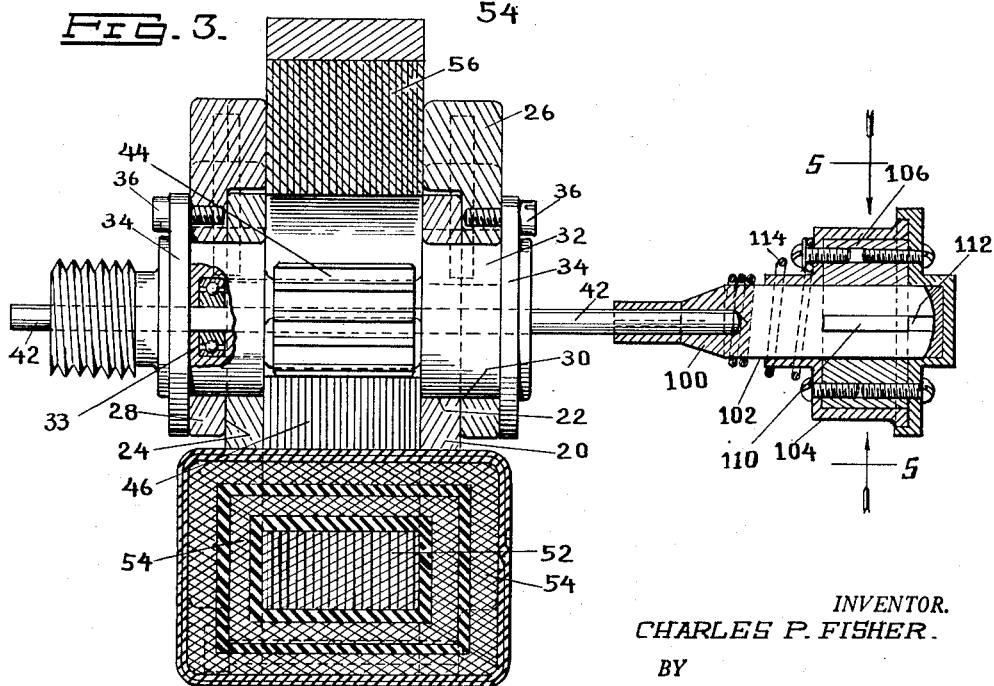
FIG. 4.
INVENTOR.
CHARLES P. FISHER.
BY
MOSES. NOLTE. CREWS & BERRY.
ATTORNEYS.

May 13, 1958     C. P. FISHER     2,834,896
STEPPING MOTOR

Filed Sept. 28, 1955     3 Sheets-Sheet 3

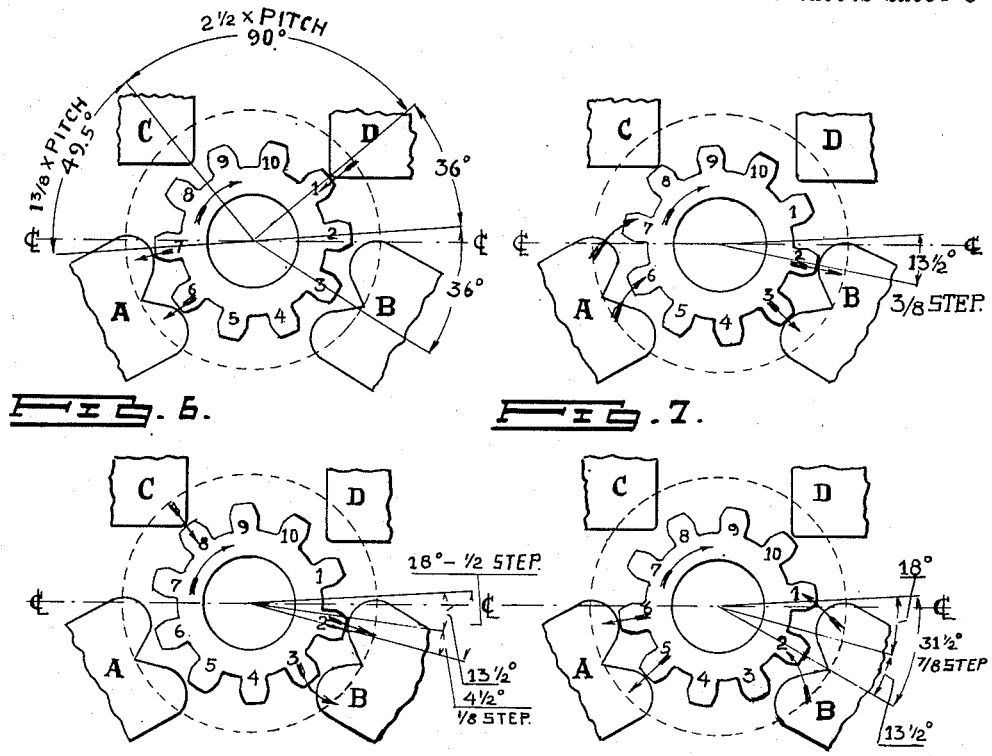

1. Torque vs Rotation developed by Permanent Magnets alone.

2. Component of Torque due only to Coil.
   Current: ———— = +
            ------ = −
   Not including Magnet Torque 3. Useful Component of Torque when Current is reversed appropriately.
   Not including Magnet Torque 4. Net available Torque, 1 and 3 added.

———— = torque from + current
------ = torque from − current

FIG. 10.

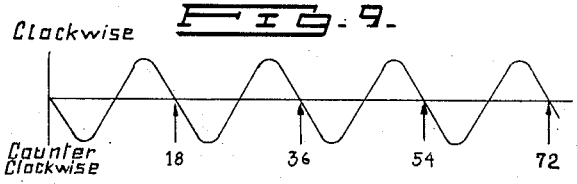
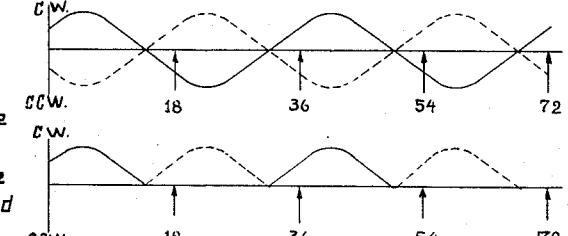
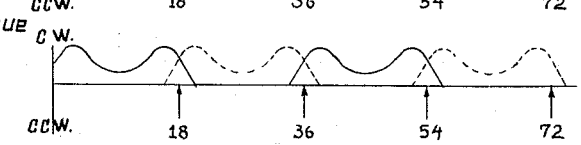

INVENTOR.
CHARLES P. FISHER.
BY
MOSES, NOLTE, CREWS & BERRY.
ATTORNEYS.

United States Patent Office 2,834,896
Patented May 13, 1958

2,834,896
STEPPING MOTOR

Charles P. Fisher, Framingham, Mass., assignor to Sigma Instruments, Incorporated, a corporation of Massachusetts Application September 28, 1955, Serial No. 537,102

18 Claims. (Cl. 310—49)

This invention relates to stepping or impulse motors actuated by or responsive to alternating or intermittent currents. The motor is analogous to a synchronous motor except that it starts and stops at each half cycle of the current variations. It can be used to produce useful torque at all angular positions of the rotor and is applicable to the operation of rotary switches or the like, as a counting device for operating a counter indicating or recording interruptions or alterations in an electric current, counting aperiodic electrical impulses, as a chronograph or stop watch, or for other similar uses.

The motor is capable of responding accurately to impulse changes at very high speeds, up to for example impulse changes on the order of two hundred (200) cycles per second depending upon the size of the motor and power available. In general the smaller the diameter of the rotor, the higher the speeds at which it may act. Operation is effected by a combination of variable and constant magnetic forces and entirely without the need for mechanical ratchets, clutches or reciprocating parts. The motors can therefore be made entirely silent in operation and practically immune to mechanical wear. The only essential moving part is a rotor which requires no windings and which may be mounted in practically frictionless and permanent ball bearings.

The invention lends itself to novel and efficient magnetic design, whereby it may be made to produce relatively large values of torque for the weight of the parts or wattage utilized. The magnetic circuits are so arranged that they are of high efficiency and all unnecessary leakage paths are eliminated.

Figure 1:
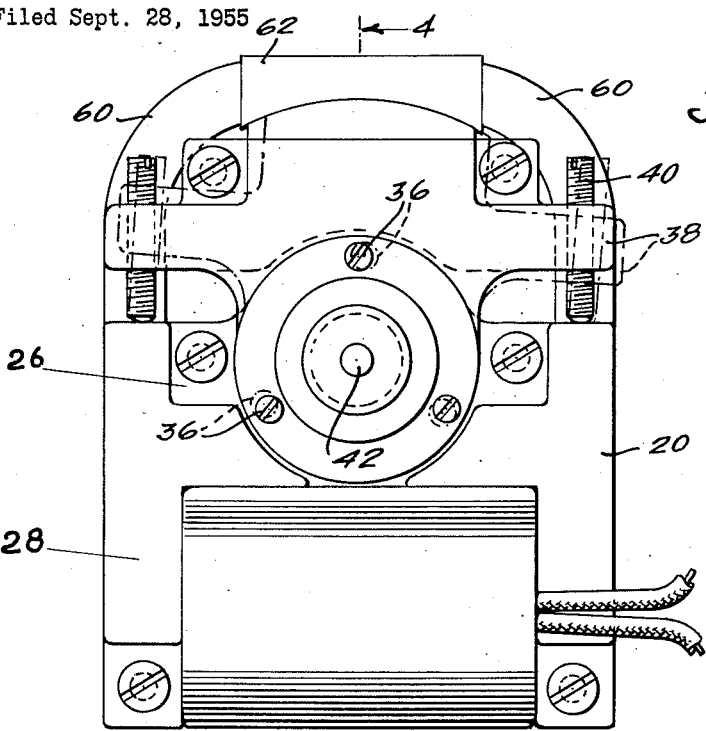
Figure 2:
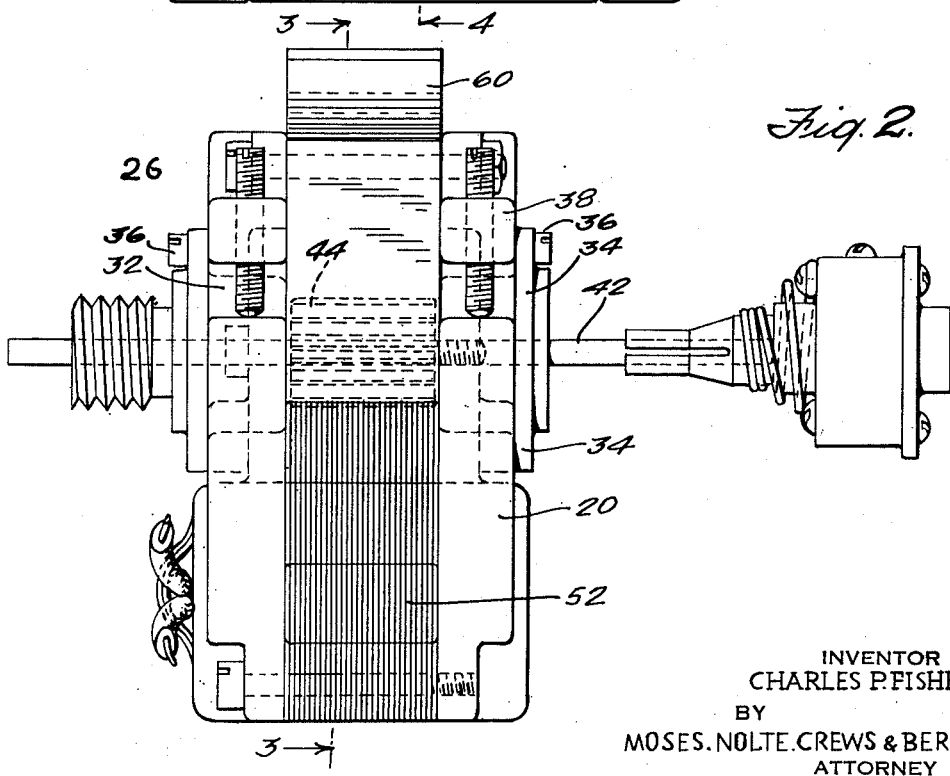

In the accompanying drawings which illustrate one preferred embodiment of the invention:

Figure 1 is an end elevation of the motor;
Figure 2 is a side elevation thereof;
Figure 3 is a vertical section on line 3—3 of Fig. 2;
Figure 4 is a vertical section on line 4—4 of Fig. 1;
Figure 5 is a vertical section of one form of damper, on line 5—5 of Fig. 4;
Figures 6, 7, 8 and 9 are diagrams showing successive steps in the driving cycle of the rotor; and
Figure 10 is a graph showing the rotor driving torque.

Referring to the drawings in detail, the particular embodiment of the invention shown comprises a pair of side frames 20 of non-magnetic material, these frames comprising body portions having holes 22 (Fig. 3) in the upper parts thereof, the holes being surrounded by annular seats 24. A pair of adjustable or auxiliary frame elements 26 have annular portions 28 fitting against the annular seats 24 and have holes 30 matching the holes 22 in the main frame members. Fitting in the two sets of matched holes are bearing bushings 32, preferably carrying small ball bearings 33. The bushings 32 are provided with flanges 34 which may be secured to the portions 28 by screws 36 and are turnable in the holes in the side frames 20, so as to provide adjustable supports for the auxiliary frame members 26. The latter are provided with ears 38 carrying adjusting screws 40 which bear on the main frame members. This provides for a slight angular or tilting adjustment of the auxiliary frame members on the main frame members for a purpose which will be explained. Mounted in the ball bearings 33 in the bushings 32 is a rotor shaft 42 carrying the toothed rotor 44 which is of soft iron or alloy of high permeability. Carried by the main frame members are the soft iron or high permeability alloy driving or torque pole pieces 46 which are preferably in the form of a plurality of laminations and terminate in the pole faces 48 adjacent to the rotor. The main frame members have downwardly projecting arms 50 between which portions of the laminated pole pieces 46 project and are clamped. Also carried by these arms is a soft iron or permeable alloy laminated core 52 on which is mounted a coil 54 which may comprise one or more windings (two being shown).

Clamped between the auxiliary frame members 26 are a plurality of soft iron or permeable alloy lamination plates 56 constituting what may be termed the detent pole member and they are formed to provide two spaced pole faces 58 adjacent to the rotor. The surfaces 59a and 59b forming the sides of these pole faces preferably converge at an angle so as to concentrate the flux at the points of the pole faces nearest to the rotor teeth. These points may be slightly rounded as shown but in the example of the invention illustrated are of narrow width so as to establish flux paths of minimum reluctance to the nearest tooth or at most two teeth. In the illustrated example the surfaces 59a and 59b are at approximately right angles to each other and the bisecting axis of the pole passes approximately through the rotor axis. This form is magnetically efficient but may be departed from if found desirable. The tilting adjustment of the auxiliary frame members permits a slight angular adjustment of the detent pole faces 58 with respect to pole faces 48 of the driving or torque poles. The provision for such adjustment is not essential and may in some cases be omitted. It is desirable, however, particularly if the direction of rotation of the motor is to be changed. The pole faces are preferably given a slight lead (for example 5°) in the intended direction of rotation. This lead should be but a small fraction of a rotational step as determined by the spacing of the rotor teeth.

Located between the auxiliary frame members are a pair of permanent magnets 60. These are so placed as to have like poles, for example south poles in contact with the driving or torque pole plates 46, and their opposite poles, for example north poles in contact with a soft iron or permeable alloy bar 62 which is in magnetic contact with tops of the plates 56. A magnetic circuit is thus provided in which the pole faces 58 of the detent magnets are magnetized in one sense, for example north, while the pole faces 48 of the driving or torque poles are magnetized by the flux of the permanent magnets in the opposite sense. The polarity of the driving or torque poles, however, may be influenced or reversed by current flowing through the coil 54. The magnets 60 may be fitted loosely between the arms 38 of the auxiliary frame members as they will be retained in position by their own magnetism and will also hold the spacer 62 in place. They may if desired be covered by a spring shield 63 of non-magnetic material (Fig. 3, omitted in Figs. 1, 2 and 4). Obviously any shape or method of mounting the magnets 60, so that a magnetic circuit of the character described is established through the rotor, may be used.

The rotor 44 may have any desired number of teeth, from four upwards. A convenient number is ten as illustrated. The angular spacing of the centers of the detent pole faces 58 is not commensurate with the angular pitch of the teeth or poles on the rotor. In the example shown, the angular spacing of the center lines of the detent pole faces is equal to two and one-half times the pitch of the rotor teeth, so that when one rotor tooth is in line with one of the detent pole faces two other teeth on the rotor are spaced equally distant from the center line of the other pole face. The angular spacing of the center lines of the detent poles from the center lines of the driving or torque pole faces 48 is also incommensurate with the pitch of the teeth. In the example shown, the spacing of the center lines of the detent pole faces from the center lines of adjacent pole faces of the driving or torque poles is approximately 1⅜ times the pitch of the rotor teeth, plus the slight decrease in the direction of rotation and increase in the other direction due to the initial displacement of the detent poles mentioned. (This spacing may be adjusted more or less if the provision for adjustment above described is employed.) Each of the driving or torque poles is shown as having two pole faces 48 spaced apart a distance equal to the pitch of the rotor teeth, so that they act on two adjacent teeth, thus increasing the flux path, but in action these two pole faces 48 on each pole may be considered as a unit.

The operation of the motor will be clear from Figs. 6 to 10. In Fig. 10, graph 1 shows a sine type curve representing the force applied to the rotor by the permanent magnetic flux of the detent poles alone. This force varies depending upon the position of the teeth with respect to the two detent poles. Graph 2 represents the force due to the current in the coil for both polarities and several steps. Graph 3 shows the useful torque due only to appropriately reversed current. The net torque resulting from the combination of the force due to the permanent magnets and the force due to reversing current in the coil is shown by graph 4. This shows that while there is some variation in the torque it is always positive and the rotor will rotate step by step, but always in the same direction. As shown by the graphs, the percentage of movement caused by the coil current is greater than the percentage of movement due to the permanent magnetic force alone, the function of the latter being to position the rotor for correct rotation from the next impulse.

Figs. 6 to 9 show successive positions of the rotor during the cycles there being ten cycles and twenty stops or steps to each complete rotation of the rotor where the rotor has ten teeth.

Fig. 6 shows what may be considered the initial position in which the rotor is stationary, there being no current applied to the coil. The rotor will be held in this position by the permanent magnetic flux which may be considered as flowing primarily from the detent pole D to tooth No. 1, and out through teeth 6 and 7 which are closest to the pole faces 48 of the driving pole A. Upon passage of current through the coil in the direction to make the pole A positive, it will make pole A a north pole, it having previously been a south pole under the influence of the permanent magnetism. The flux from pole A will first neutralize the effect of the permanent magnetic flux and then reverse the flow of the flux through the rotor as the coil-produced flux increases in value. This will cause the coil-produced flux to join or link that of the permanent magnet (on the left) and return only at teeth 2 and 3 which are adjacent of the pole faces of the driving pole B. This will result in a clockwise rotation of the rotor to the position shown in Fig. 7, the direction of the flux being shown by the arrows. An interruption or reversal of the coil current now takes place and during the instant of stoppage or reversal during which the coil flux ceases or falls to such a low value that it is less than the value of the flux produced by the permanent magnet, the rotor will be advanced by the permanent magnet flux. The permanent magnet flux will not advance the rotor any further than a fraction of a step, bringing the tooth nearest to detent pole C (tooth No. 8) into alignment with the detent pole C which is the position shown in Fig. 8 where the permanent magnet flux is indicated as flowing primarily through detent pole C through tooth 8 to teeth 2 and 3 which are adjacent to faces of the pole B.

In the example illustrated the pitch of the teeth is 36°. The movement produced by the coil flux from position Fig. 6 to position Fig. 7 is ⅜ of a step or 13½°. The movement produced by the permanent magnet flux when the coil flux drops, namely that from Fig. 7 to Fig. 8 is 4½° which added to the 13½° makes a total of 18° or ½ of a step.

The reversed current now increases to a value overcoming the effect of the permanent magnet flux and causing the rotor to advance another ⅜ step or 13½° more to the position shown in Fig. 9. This movement is brought about by the flux flowing from pole B primarily through the right hand magnet pole D and from teeth 5 and 6 to pole A. Teeth 5 and 6 being nearest to pole A, the rotor is moved clockwise until these teeth are in alignment with the pole faces of pole A.

Upon the next interruption or reduction in flow of the current, the rotor advances under the permanent magnet flux to a position corresponding with that shown in Fig. 6 except that tooth 10 is now in alignment with detent pole D instead of tooth 1. A complete cycle has now been accomplished and the rotor has moved a distance of one tooth.

The device described is capable of functioning at very high speeds, and the rotor will start and stop as described. At high speeds its tendency to come to rest at the stopping points during the cycle in oscillatory manner may falsely cause it to gain or lose a step. In order to prevent such oscillation it is desirable in many cases to provide a damping effect, which can be accomplished in various ways. One of the most satisfactory methods is by the use of a rotary vane-type air dashpot. Such a construction has been illustrated in Figs. 2, 4 and 5. Mounted on the end of shaft 42 is a body 100 of magnesium or other light material having a cylindrical surface 102 on which is rotatably mounted a light shell 104. The latter has fixed therein two sectors 106 which may be of light metal, such as aluminum or magnesium. Between the ends of the sectors are fan-shaped closed air spaces 108. A vane 110, which may conveniently be made of a piece of rigid plastic or of light magnesium, is mounted transversely in a notch 112 in the member 100, and its ends form blades extending across the fan-shaped spaces 108. The fit is closed but some air leakage can take place around the edges of the blades. A light spiral spring 114 is anchored at one end to the shell 104 and at the other end to the member 100 and tends to restore the shell to a neutral position in which the blades of the vane 110 are centrally positioned in the spaces 108. Upon the sudden stopping of the shaft 42 the inertia of the shell 104 and the sectors 106 will cause a slight over-travel of the shell which will be resisted by the air compressed by the vane blades in the spaces 108; this compressed air will leak past the vanes relatively slowly. This will exert the necessary damping action and prevent chattering or rebound. The shell, however, is relatively light so that a minimum of inertia is applied to the rotor. This type of dashpot is also substantially unaffected by temperature changes.

The slight angular adjustment of the auxiliary frame members carrying the detent pole member permits the pole faces 58 to be shifted slightly with reference to the pole faces 48, so as to assure the most positive and rapid action in starting and stopping the rotor. The pole faces may also be shifted to run the motor in an anticlockwise direction. In this case pole faces 58 will be moved slightly to the left and the direction of rotation of the motor will be reversed.

The limits of speed of operation of the motor of this invention are determined by the ratio of rotor moment of inertia to available torque produced by the permanent and variable magnetic fields. In general this ratio is held at a high value by making the rotor of as small a diameter as is consistent with good mechanical and magnetic design and the use of adequate and durable bearings. The maximum available torque is most effectively secured if the respective fields produced by the permanent magnets and by the coil signal (at its peak) are equal or of near the same magnitude. The strengths of these fields should preferably be sufficient successively to cause the "active" teeth of the rotor to reach or approach a state of saturation.

It is is desired to secure increased motor torque this is best done by lengthening the rotor (or using a plurality of rotors on the same shaft) and correspondingly lengthening the pole faces. This will result in increasing the flux and torque at approximately the same ratios as the increase in rotor moment of inertia.

In a typical embodiment of the invention (illustrated on a scale of approximately 2:1) the rotor used is three eighths (⅜) inch diameter and one-half (½) inch long and has a moment of inertia of approximately 0.6 gm.-cm$^2$. It is made of soft iron or high saturation-density alloy. The respective torque due to the coil signal and permanent field are each approximately 100 gm.-cm. The coil or coils used total approximately 250 ampere-turns. This motor is capable of operating at speeds up to approximately two hundred cycles per second (400 starts, 400 stops).

The above stated dimensions are merely illustrative of a satisfactorily operative design. They are not limitative of the invention which may be embodied in units of any practicable size depending on power requirements and speeds of operation desired.

The symmetrical arrangement of the poles permits the motor to be operated in either direction, there being preferably the slight angular advance in the desired direction of rotation of the detent poles as already described. The narrow, tapered or generally pointed form of the detent poles results in the concentration of the flux adjacent to one, or a limited number of teeth of the rotor adjacent to each pole, which produces a sharp detent action so that upon the reduction or reversal of the coil current the movement of the rotor is instantly stopped and as quickly restarted on the rise of the coil current. This results in the practically instantaneously starting and stopping action characteristic of the present stepping motor, which is most essential to the accomplishment of its purposes. The pointed or narrow faced detent poles are preferably spaced a considerable distance apart. In the example shown this is two and one-half times the distance between the rotor teeth and is also several times the width of the individual detent pole faces.

Where "soft iron" is referred to in the specification or claims the term is to be understood as inclusive of other suitable metals or alloys of high permeability.

In the example of the invention described above the use of alternating current has been assumed. The device can, however, be used in connection with interrupted direct current. This may be accomplished for example by providing two coils in one of which a continuous current flows while in the other coil an interrupted current of greater value than the continuous current, for example twice that of the continuous current, is used. This will cause the rotor to move by steps in the manner already described.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

I claim:

1. A stepping motor having a rotatable soft iron armature with a plurality of spaced poles thereon, a stationary field structure surrounding the armature having at least one detent pole with a pole face of limited area to concentrate flux in a single adjacent armature pole, a plurality of torque poles, means for establishing a permanent magnetic circuit making said detent pole of one polarity, and said torque poles of the opposite polarity, said torque poles being linked in a variable magnetic circuit having coil means associated therewith for modifying the flux therein, and means for supplying variable current to said coil means so as to reverse the polarity of a part only of the torque poles at each current change.

2. A damper for a stepping motor or the like comprising a body mounted on the armature shaft on which is rotatably mounted a shell having substantially but not completely closed fan shaped air spaces therein, the body carrying a vane working in said air spaces and spring means connecting the body and shell to restore the shell to a neutral position.

3. A stepping motor as claimed in claim 1 in which the detent pole is angularly advanced in the intended direction of rotation with respect to the torque poles, a distance less than half the spacing between adjacent armature poles so that upon a building up of the flux in the torque poles the armature will be instantly started in a definite direction.

4. A stepping motor including a field structure having a plurality of spaced detent poles and a plurality of spaced torque poles, a permanent magnetic circuit linking the detent poles and the torque poles, said torque poles being of opposite polarity to the detent poles in said permanent magnetic circuit, a variable magnetic circuit including said torque poles in which the flux may be reversed so as to change the polarity of at least one of said torque poles while increasing the original polarity of another torque pole, and a multitoothed soft iron armature rotatably mounted in the field of said several field poles, said armature being independent of said magnetic circuits except to the extent that it forms a low reluctance path for flux passing between said poles.

5. A stepping motor as claimed in claim 4 in which the detent poles have narrow faces not substantially wider than faces of the armature poles.

6. A stepping motor as claimed in claim 5 in which all the poles are spaced from one another by distances greater than the space between adjacent armature poles.

7. A stepping motor as claimed in claim 4 in which the ratio of magnetically produced torque to armature moment of inertia is not less than 100:1.

8. A stepping motor having a notched soft iron armature with a plurality of equally spaced poles thereon, the number of poles being not less than four, a stationary field structure surrounding the armature, said field structure having at least four poles, means for establishing a permanent magnetic circuit in said field structure making at least two of said poles north poles and the remainder of said poles south poles, one set of poles of like polarity being linked in a variable magnetic circuit having coil means associated therewith for modifying the flux therein, means for supplying alternating or interrupted current to said coil means so as to reverse the polarity of one or the other of said linked poles at each current change, the spacing between the permanently magnetized poles being incommensurate with the spacing of the poles on the armature, and the spacing between adjacent north and south poles of the field being incommensurate with the spacing of the armature poles.

9. A stepping motor as claimed in claim 8 in which means are provided for altering the spacing between the poles linked in the permanently magnetized circuit only and the poles in the variable magnetic circuit.

10. In a stepping motor, a field structure including a plurality of spaced detent poles and a plurality of spaced torque poles, a permanent magnetic circuit linking the detent poles and the torque poles, said detent poles being of like polarity and said torque poles being of opposite polarity to the detent poles in said permanent magnetic circuit, said torque poles being also contained in a variable magnetic circuit in which the flux may be reversed so as to change the polarity of at least one of said torque poles while increasing the original polarity of another torque pole, and an armature having spaced poles mounted in the field of said several field poles and movable relatively thereto, the spacing between the detent poles being at least one and one-half times the spacing between the armature poles.

11. A stepping motor having a pair of spaced detent poles and a pair of spaced torque poles, permanent magnetic means for magnetizing said detent poles to like polarity and said torque poles to like polarity opposite to that of said detent poles, a soft iron armature movably mounted in the field of said detent and torque poles, said armature having at least four poles the spacing of which is incommensurate with the spacing between the detent and torque poles, said torque poles being included in a variable magnetic circuit, the flux therein being reversible so as to reverse the polarity of one of said torque poles, while increasing the original polarity of the other torque pole.

12. A stepping motor having a non-magnetic frame, a soft iron armature rotatably mounted in said frame, said armature having a plurality of equally spaced poles, soft iron pole pieces carried by said frame at one side of said armature, said pole pieces having two spaced poles, the spacing between said poles being at least one and one-half times the spacing of the poles on the armature, a second set of soft iron pole pieces mounted in said frame adjacent to said armature, said pole pieces being attached to a soft iron core carrying a coil, and a permanent magnet arranged to magnetize one set of said field pole pieces north, and the other set of said field pole pieces south.

13. A stepping motor as claimed in claim 12 in which a pair of permanent magnets are used, like ends of the magnets engaging one set of pole pieces, the opposite like ends of the magnets engaging a soft iron mass in magnetic contact with the other set of pole pieces.

14. A stepping motor having a non-magnetic frame, a soft iron armature rotatably mounted in said frame, said armature having a plurality of equally spaced poles, soft iron detent pole pieces carried by said frame at one side of said armature, said pole pieces having two spaced poles, the spacing of said poles being incommensurate with the spacing of the poles on the armature, a second set of soft iron pole pieces mounted in said frame adjacent to said armature, constituting torque poles, said pole pieces being attached to a soft iron core carrying a coil, the spacing of the pole pieces of the two sets from each other being incommensurate with the spacing of armature poles, and a permanent magnet mounted on said frame arranged to magnetize one set of said field pole pieces north, and the other set of said field pole pieces south.

15. A stepping motor comprising a pair of non-magnetic frame members, two laminated L-shaped pole members clamped between the frame members, a laminated core member clamped between the frame members and in contact with the lower legs of said L-shaped pole members, a winding on said core, a laminated U-shaped pole piece clamped between said frame members and having pole pieces thereon spaced from each other and from the pole faces of said L-shaped pole pieces, said L-shaped pole pieces having seats thereon, a seat on the top of said U-shaped pole piece, a soft iron body resting on said seat, permanent magnets having like poles resting on the seats on the L-shaped pole pieces and like poles of opposite polarity engaging the ends of said soft iron body resting on the U-shaped pole piece, a shaft rotatably mounted in said frame and a soft iron armature mounted on said shaft and having a plurality of equally spaced poles cooperating with the field poles, the spacing of the poles on the U-shaped pole piece being greater than the spacing between such poles and the adjacent poles on the L-shaped pole pieces and being incommensurate with the spacing of the poles on the armature.

16. A stepping motor as claimed in claim 1 in which a torsional vibration damper is mounted to rotate with the armature, the damper comprising a body mounted on the armature shaft on which is rotatably mounted a shell having fixed therein two sectors between the ends of which and the shell are substantially but not completely closed fan shaped air spaces, the body carrying a vane working in said air spaces, and spring means connecting the body and shell to restore the shell to a neutral position.

17. An electro-magnetic device having a rotatable armature provided with equally spaced poles, and a field structure surrounding said armature, said field having a plurality of spaced detent poles having salient pole faces of such size as to localize flux in individual armature poles, said detent poles being spaced apart at a distance of at least one and one-half times the distance between adjacent armature poles, said field also including a plurality of spaced torque poles spaced from the detent poles and from each other, means for establishing a permanent magnetic circuit making said detent poles of one polarity and said torque poles of the opposite polarity in said permanent magnetic circuit, said torque poles being linked in a variable magnetic circuit having coil means associated therewith which upon application of variable current thereto reverses the polarity of a part only of the torque poles at each current change.

18. A construction as claimed in claim 17 in which means are provided for altering the positions of the detent poles with respect to the torque poles.

References Cited in the file of this patent

UNITED STATES PATENTS

| | | |
|---|---|---|
| 1,519,675 | Ford | Dec. 16, 1924 |
| 1,667,794 | Michl | May 1, 1928 |
| 2,499,316 | Johnson | Feb. 28, 1950 |
| 2,659,853 | Morrison | Nov. 17, 1953 |
| 2,677,090 | Fleming-Williams et al. | Apr. 27, 1954 |

FOREIGN PATENTS

| | | |
|---|---|---|
| 28,539 | Great Britain | of 1902 |
| 391,565 | Great Britain | May 4, 1933 |
| 506,508 | Canada | Oct. 12, 1954 |